Aug. 13, 1957 G. FEFER ET AL 2,802,929
METHODS AND APPARATUS FOR SURFACE GRINDING MATERIALS
Filed Oct. 20, 1953
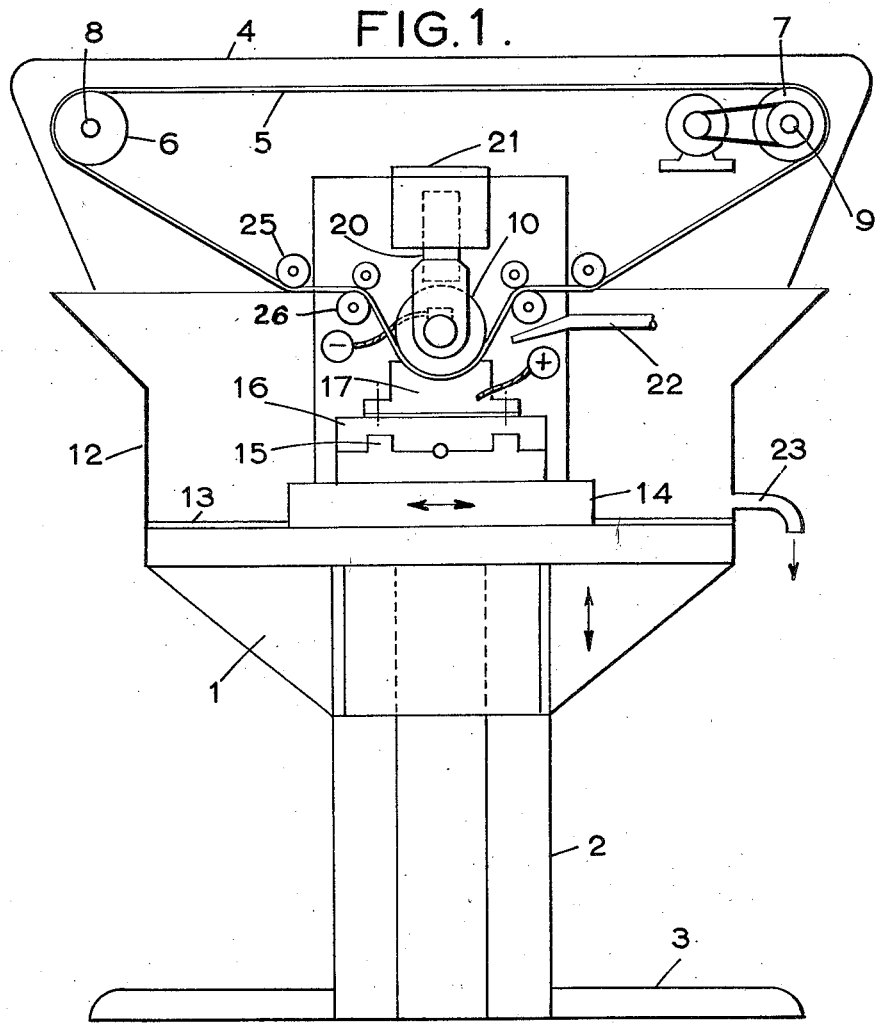
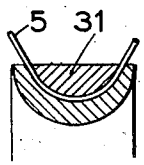
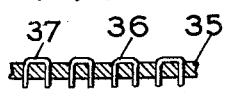
Inventors
G. Fefer + D. W. Rudorff
By Shoemaker & Mattare
Attorney

2,802,929

METHODS AND APPARATUS FOR SURFACE GRINDING MATERIALS

Gregory Fefer, Newnham on Severn, and Dagobert William Rudorff, London, England, assignors to Sparcatron Limited, Abbey Yard, Bath, England, a British company Application October 20, 1953, Serial No. 387,196

7 Claims. (Cl. 219—69)

This invention relates to methods and apparatus for surface grinding materials and has more especial reference to belt grinders for shaped articles such as turbine or compressor blades of electrically conductive materials which can be worked electrolytically or through the medium of spark or arc discharges.

In the patent specification No. 2,526,423, methods and apparatus for working electrically conductive materials are described in which the tool is maintained in predetermined close relation to the workpiece in an electric circuit in which are included the tool and the workpiece in such manner that electric oscillations of a spark discharge are continuously produced while a flow of fluid is maintained at the workface.

Moreover, in specification No. 2,526,423 there is also described apparatus in which the tool has a cutting edge of greater length than the cut to be produced and which works after the manner of a band saw in that rectilinear relative motion is brought about between the tool and the workpiece.

Broadly stated, the improved method of grinding, polishing or shaping articles of electrically conductive materials according to the present invention similarly includes a band or belt between which and the workpiece relative linear motion is produced and which is guided in the vicinity of the workpiece over a suitably shaped former and there imparts the desired contour to the surface of the workpiece being worked.

The belt or band is preferably continuous and may be of metal although advantageously it is of metallised fabric or rubber or rubber impregnated fabric suitably with staples extending from one surface to the other of the belt or from one surface thereof to a conductive operative layer at the other surface.

The workpiece and band or belt are connected in an electric circuit as described in any of the aforementioned specifications, and where it is desired to supplement the electrolytic or spark discharge action by an abrasive action during the working of the apparatus, the staples may be open ended at the operative face of the belt or projecting therefrom into abrasive contact with the surface of the article being ground or polished. In such a combined operation the fluid film between the band or belt and the workpiece will be broken during the periods of abrasive working and means will be provided for opening the circuit during such periods.

When grinding, machining or polishing articles of complex shape such as turbine or compressor blades, it may be advantageous for the belt to be not only flexible but also resilient so as to be capable of recovering substantially its pristine form after being stretched over the former which will have an operative surface complementary to the contour of the article and thus be curved in intersecting planes.

Reference will now be had to the accompanying drawings in which the invention is illustrated and in which Figure 1 is a diagrammatic view of an embodiment of apparatus for carrying out the method according to the invention, Figure 2 being a detail sectional view showing how the band or belt is guided over a suitably shaped former to impart the required contour to the workpiece. Figures 3 and 4 are also detail views of portions of band or belt suitable for carrying out the electrolytic or spark discharge shaping operation according to the invention.

Referring now to the drawing but first more particularly to Figures 1 and 2, a worktable 1 is mounted on a column 2 equipped with a suitable pedestal 3, the work table being preferably adjustable vertically in relation to the column so as to be set at any convenient height.

Mounted above the table 1 on the column 2 and suitably enclosed in a shroud or cover designated 4 is an endless belt 5 riding pulleys 6 and 7 suitably journalled at 8 and 9 respectively the lower run of the belt 5 passing under a shaped former or pulley 10, hereafter more fully described.

Also mounted on the table 1 under the shroud 5 is a splash tank 12 in the base of which is a guide 13 for a slide 14 which can be set in any desired position transversely of the tank and on the upper surface of the transverse member 14 are longitudinal guides 15 on which rides a second slide or stock 16 to which a workpiece indicated at 17 is adapted to be detachably secured.

By suitably adjusting the traverse 14 and stock 16 horizontally, and the table 1 vertically the workpiece 17 may be initially set in any desired position relative to the belt 5 where it passes under the former 10.

The band or belt 5 as described in patent specification No. 2,526,423 is connected in the power circuit so that it is maintained of negative polarity in relation to the workpiece 17 which is maintained positive, the rollers 6 and 7 or their bearings being suitably insulated while the shaper or former 10 is carried by an arm 20 by which it may advance the operative portion of the belt 5 towards, or retract it from, the workpiece 17. Control of the arm may be by a split field motor housed at 21 or in any other appropriate manner.

22 is a pipe for supplying bathing fluid in the working zone i. e. the zone where the portion of the belt 5 riding over the shaped former 10 engages the workpiece 17 and 23 is a fluid return pipe from the splash tank 12 by which the bathing fluid is conveyed to a settling tank for the removal of impurities and recirculation to the supply pipe 22.

The belt 5 may be connected to the power circuit through the shaped former 10 and its mounting arm 20 which may be carried by, but insulated from, the head of the column 2.

In Figure 1 the belt is shown riding under four supplementary rollers 25 and over the two additional supplementary rollers 26 in the vicinity of the former 10, these supplementary rollers being also carried at the head of the column 2 but insulated therefrom.

The transverse contour of the operative surface of the roller 10 may be convex or concave or it may have re-entrant and protuberant portions, while in place of a roller the contour shaping may be effected by a non-rotatable former 31 as shown in Figure 2 the operative profile of which, whereunder the belt 5 slides and is correspondingly distorted, determines the shape to be imparted to the workpiece 17.

The belt or band 5 may be of metal or metallized fabric although preferably as shown in Figure 3 it is of fabric 35, with metal staples 36 passing from one surface to the other of the belt the projecting free ends of the staples 36 facing downwardly towards the workpiece 17 and the closed yokes 37 being on the opposite face and bearing on the roller 10 or its equivalent such as the guide 31 so that at least those opposite the workpiece 17 are maintained of negative polarity when the shaping and grinding operation is in progress.

Alternatively one surface of the belt may be rendered conductive, say by metallisation as aforementioned in which case such surface and all the staples are maintained of negative polarity during the working of the apparatus.

Figure 4 is a detailed view of a portion of an alternative form of belt suitable for carrying out the process where the staples 36 are replaced by metal studs or rivets 38, the heads 39 of which occupy the inside surfaces of the belt 5 i. e. the upper surface which passes under the shaping pulley 10 or its equivalent such as the contour member 31.

It will be appreciated that with either the stapled form employed in the embodiment shown in Figure 3 with the staples 36 projecting through the belt 35 or with the studs 38 as shown in Figure 4 similarly projecting through the belt towards the workpiece 17, abrasive contact with the surface of the article being shaped, ground or polished will occur particularly where the boundary layer or film of dielectric or other bathing fluid is broken down, and that means may be provided for opening the power circuit during such periods of boundary layer breakdown. As a further alternative, the endless belt or band may be woven or braided of conducting wire or tape of suitable gauge and mechanical properties.

The electrode control mechanism 21 may be adapted to vibrate the shaper or former 10 as the operation proceeds or a separate mechanism for this purpose may be provided or alternatively the workpiece may be mounted so that it undergoes high frequency vibrations during electrolytic or spark discharge working, suitably with the electrical circuit arranged according to United States Patent No. 2,526,423.

The invention is of particular utility in working electrically conductive materials particularly those composed of hard metals, metal carbides, tool steels, stainless steels and refractory metal compounds which are otherwise most difficult to machine and the improved method effects considerable economy in the shaping, grinding and polishing of articles made from such materials.

What we claim is:

1. Apparatus for forming articles of electrically conductive material by removing stock therefrom which comprises, a support, an endless flexible member mounted on said support, said member being of band-like form and being appreciably wider than thick, means for mounting a workpiece on said support, a shaped former mounted on the support engaging said flexible member and maintaining a portion of the same in close proximity to the workpiece, means for moving the flexible member along its endless path, means for imparting opposite electric polarity to the workpiece and said flexible member whereby the workpiece is formed in conformity to the contour of said shaped formed by electric disintegration of the workpiece.

2. The method of forming articles of electrically conductive material by removing stock therefrom which comprises, placing a workpiece in close proximity to an endless flexible band-like electrode of a width several times its thickness, deforming the electrode to a desired contour in the region thereof immediately adjacent the workpiece, moving the electrode linearly with respect to the workpiece, imparting opposite polarity to the workpiece and electrode.

3. The method of forming articles as defined in claim 2 wherein the electrode is deformed both in the direction of relative motion between the electrode and workpiece and transversely thereof.

4. Apparatus for forming articles of electrically conductive material by removing stock therefrom which comprises, a support, an endless flexible belt mounted on said support, means for mounting a workpiece on said support adjacent said belt, means for moving the belt along its endless path, a shaped former mounted on said support and engaging that face of the belt opposite the workpiece to impart a desired contour to the surface of the workpiece, means for imparting opposite electrical polarity to the belt and the workpiece, said belt having at least portions thereof formed of electrically conductive material, means for rapidly moving the workpiece and the belt into and out of engagement whereby the workpiece is formed by alternate abrading and electric disintegrating action on the workpiece.

5. Apparatus according to claim 4 wherein the belt is an endless element of non-conductive material having electrical conductors extending from one surface to the other of the belt.

6. The method of forming articles of electrically conductive material by removing stock therefrom which comprises, placing a workpiece in close proximity to an endless flexible electrode, moving the electrode linearly with respect to the workpiece, imparting opposite polarity to the electrode and workpiece, periodically moving the electrode and workpiece into and out of engagement to effect alternate abrading and electric disintegrating action on the workpiece.

7. Apparatus according to claim 4 wherein the last means includes a split field electric motor connected to said shaped former.

References Cited in the file of this patent

UNITED STATES PATENTS

| | | |
|---|---|---|
| 416,873 | Tilghman | Dec. 10, 1889 |
| 2,319,401 | Hebeler | May 18, 1943 |
| 2,355,838 | Young et al. | Aug. 15, 1944 |
| 2,385,665 | Warwick | Sept. 25, 1945 |
| 2,431,822 | Murray | Dec. 2, 1947 |
| 2,526,423 | Rudorff | Oct. 17, 1950 |